(12) United States Patent
Wei et al.

(10) Patent No.: US 11,537,910 B2
(45) Date of Patent: Dec. 27, 2022

(54) METHOD, SYSTEM, AND COMPUTER PROGRAM PRODUCT FOR DETERMINING CAUSALITY

(71) Applicants: NEC CORPORATION, Tokyo (JP); Wenjuan Wei, Beijing (CN)

(72) Inventors: Wenjuan Wei, Beijing (CN); Chunchen Liu, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 426 days.

(21) Appl. No.: 16/759,115

(22) PCT Filed: Mar. 28, 2019

(86) PCT No.: PCT/CN2019/080134
§ 371 (c)(1),
(2) Date: Apr. 24, 2020

(87) PCT Pub. No.: WO2020/191722
PCT Pub. Date: Oct. 1, 2020

(65) Prior Publication Data
US 2021/0232941 A1      Jul. 29, 2021

(51) Int. Cl.
*G06N 5/04* (2006.01)
*G06F 17/16* (2006.01)
(Continued)

(52) U.S. Cl.
CPC ............. *G06N 5/04* (2013.01); *G06F 17/16* (2013.01); *G06F 17/18* (2013.01); *G06N 7/005* (2013.01)

(58) Field of Classification Search
CPC .......... G06N 5/04; G06N 7/005; G06F 17/16; G06F 17/18
See application file for complete search history.

(56) References Cited

U.S. PATENT DOCUMENTS

| 2019/0385100 A1* | 12/2019 | Zaman | G06Q 10/06375 |
| 2021/0005278 A1* | 1/2021 | Chang | G16B 40/00 |
| 2021/0104334 A1* | 4/2021 | Zakariah | G06K 9/6298 |

FOREIGN PATENT DOCUMENTS

| CN | 102799567 A | 11/2012 |
| CN | 108959922 A | 12/2018 |

(Continued)

OTHER PUBLICATIONS

International Search Report for PCT/CN2019/080134 dated Dec. 27, 2019 [PCT/ISA/210].

(Continued)

*Primary Examiner* — Dac V Ha
(74) *Attorney, Agent, or Firm* — Sughrue Mion, PLLC

(57) ABSTRACT

Implementations of the present disclosure relate to a method, system and program product for determining a causality between a plurality of variables. Specifically, a method is provided for determining a causality between a plurality of vectors, which comprises: in response to a data set of a plurality of samples associated with the plurality of variables being collected, obtaining a matrix describing the causality between the plurality of variables, each sample among the plurality of samples comprising data that corresponds to the plurality of variables; determining fitness associated with the causality and sparsity associated with the causality based on the data set and the matrix, wherein the sparsity comprises a constraint on each vector among a plurality of vectors in the matrix, the constraint corresponding to a variable among the plurality of variables; building a first problem formula describing the causality according to the determined fitness and sparsity; and solving the built first problem formula so as to obtain a candidate result of the matrix. Further, there is provided a corresponding system and computer program product.

15 Claims, 7 Drawing Sheets

(51) Int. Cl.
*G06F 17/18* (2006.01)
*G06N 7/00* (2006.01)

(56) References Cited

FOREIGN PATENT DOCUMENTS

CN 109190702 A 1/2019
EP 3 026 613 A1 6/2016

OTHER PUBLICATIONS

Written Opinion for PCT/CN2019/080134 dated Dec. 27, 2019 [PCT/ISA/237].

* cited by examiner

METHOD, SYSTEM, AND COMPUTER PROGRAM PRODUCT FOR DETERMINING CAUSALITY

CROSS REFERENCE TO RELATED APPLICATIONS

This application is a National Stage of International Application No. PCT/CN2019/080134 filed Mar. 28, 2019.

FIELD

Various implementations of the present disclosure relate to a probability model, and more specifically, to a method, system and computer program product for determining a causality.

BACKGROUND

A probability model is a graphical network model obtained based on probabilistic inference, which refers to obtaining association relationships between a plurality of variables by analyzing collected information that corresponds to these variables. Bayesian networks are probability models proposed for solving uncertainty and incompleteness, which have been widely used in a plurality of areas.

A Bayesian network may describe causalities between a plurality of variables via a directed acyclic graph (DAG) which may comprise nodes representing variables and directed edges representing causalities between these variables. For example, a directed edge from a parent node pointing to its child node may indicate: a variable represented by the parent node and a variable represented by the child node have a direct causality. Bayesian networks are applicable to express and analyze uncertain and probabilistic events and may be determined from collected incomplete, inexact or uncertain information corresponding to a plurality of variables.

Various technical solutions have been developed for determining a causality based on collected data sets. However, these technical solutions may result in excessive calculation, or fail to find an optimal solution because calculation ends too early.

SUMMARY

Generally, since causality determination is a basis for subsequent processing and analysis, how to determine a more credible causality based on a collected data set will affect the accuracy of subsequent operations to some extent. Therefore, it is desirable to develop and implement a technical solution for determining a causality more accurately and effectively. It is desired that when generating the causality, the technical solution may obtain an optimal result so as to improve the learning precision for the causality. Further, it is desired to reduce the amount of computation during a determination of the causality so as to obtain the causality more effectively.

According to a first aspect of the present disclosure, a method is provided for determining a causality between a plurality of vectors. The method comprises: in response to a data set of a plurality of samples associated with the plurality of variables being collected, obtaining a matrix describing the causality between the plurality of variables, each sample among the plurality of samples comprising data that corresponds to the plurality of variables; determining fitness associated with the causality and sparsity associated with the causality based on the data set and the matrix, where the sparsity comprises a constraint on each vector among a plurality of vectors in the matrix, the constraint corresponding to a variable among the plurality of variables; building a first problem formula describing the causality according to the determined fitness and sparsity; and solving the built first problem formula so as to obtain a candidate result of the matrix.

According to a second aspect of the present disclosure, a system is provided for determining a causality between a plurality of variables, the system comprising: one or more processors; a memory coupled to at least one processor of the one or more processors; computer program instructions stored in the memory which, when executed by the at least one processor, cause the system to execute a method for determining a causality between a plurality of variables. The method comprises: in response to a data set of a plurality of samples associated with the plurality of variables being collected, obtaining a matrix describing the causality between the plurality of variables, each sample among the plurality of samples comprising data that corresponds to the plurality of variables; determining fitness associated with the causality and sparsity associated with the causality based on the data set and the matrix, where the sparsity comprises a constraint on each vector among a plurality of vectors in the matrix, the constraint corresponding to a variable among the plurality of variables; building a first problem formula describing the causality according to the determined fitness and sparsity; and solving the built first problem formula so as to obtain a candidate result of the matrix.

According to a third aspect of the present disclosure, an apparatus is provided for determining a causality between a plurality of vectors. The apparatus comprises: an obtaining module configured to, in response to a data set of a plurality of samples associated with the plurality of variables being collected, obtain a matrix describing the causality between the plurality of variables, each sample among the plurality of samples comprising data that corresponds to the plurality of variables; a determining module configured to determine fitness associated with the causality and sparsity associated with the causality based on the data set and the matrix, where the sparsity comprises a constraint on each vector among a plurality of vectors in the matrix, the constraint corresponding to a variable among the plurality of variables; a building module configured to build a first problem formula describing the causality according to the determined fitness and sparsity; and a solving module configured to solve the built first problem formula so as to obtain a candidate result of the matrix.

According to a fourth aspect of the present disclosure, a computer program product is provided. The computer program product comprises a computer-readable storage medium with a computer-readable program stored thereon, where the computer-readable program, when executed on a computing device, causes the computing device to implement the method for determining a causality between a plurality of variables.

By means of the technical solution for determining causality between a plurality of variables as described in the present disclosure, it is possible to give independent constraint control for various vectors in a matrix that describes the causality, and further to more accurately determine the causality. Moreover, it is possible to reduce the amount of computation during determining the causality, and further to cut down overheads of various computing resources.

BRIEF DESCRIPTION OF THE DRAWINGS

Through the more detailed description in the accompanying drawings, features, advantages and other aspects of implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, these implementations are provided to make the present disclosure more thorough and complete and to fully convey the scope of the present disclosure to those skilled in the art.

Figure 1:
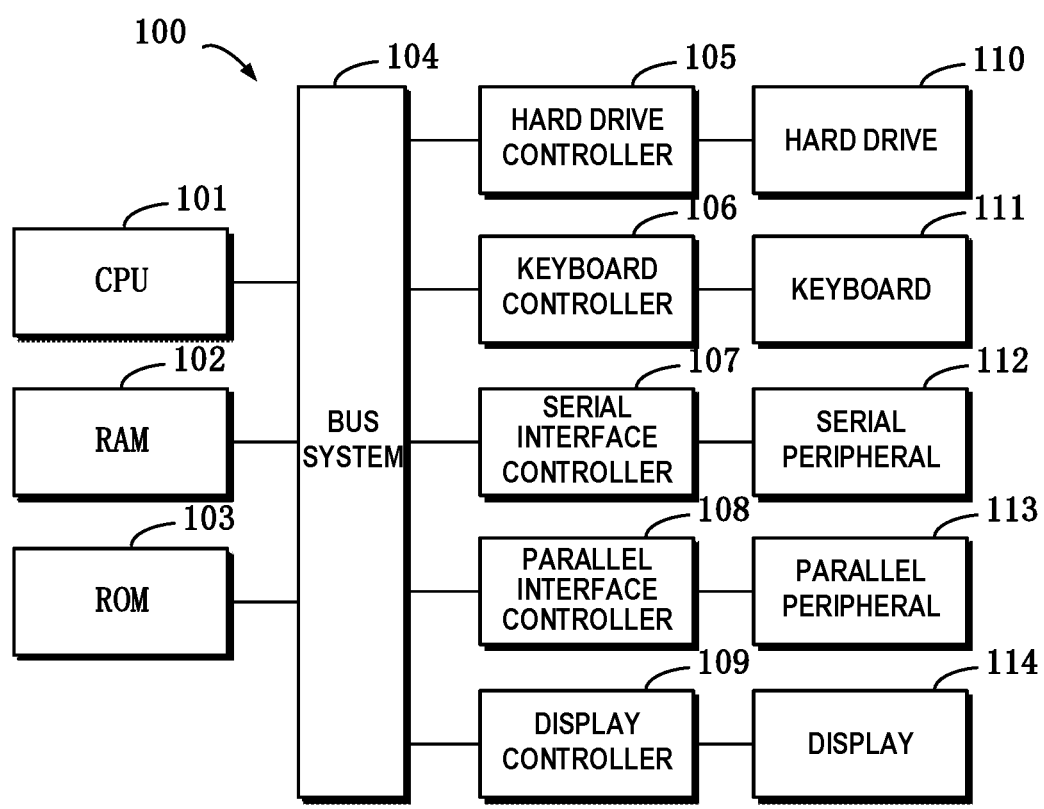
FIG. 1 schematically shows a block diagram of an example computing system which is applicable to implement implementations of the present invention.

FIG. 1 illustrates an example computing system 100 which is applicable to implement implementations of the present invention. As illustrated in FIG. 1, the computer system 100 may include: CPU (Central Processing Unit) 101, RAM (Random Access Memory) 102, ROM (Read Only Memory) 103, Bus System 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105, Keyboard 111 is coupled to Keyboard Controller 106, Serial Peripheral Equipment 112 is coupled to Serial Interface Controller 107, Parallel Peripheral Equipment 113 is coupled to Parallel Interface Controller 108, and Display 114 is coupled to Display Controller 109. It should be understood that the structure as illustrated in FIG. 1 is only for the purpose of example rather than limiting the scope of the present invention. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, in some implementations, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium other than a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the scenario related to the remote computer, the remote computer may be connected to the user's computer through any type of network, including a local area network (LAN) or a wide area network (WAN), or a connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or another programmable data processing apparatus to produce a machine, such that the instructions, which execute via the processor of the computer or another programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the functions/acts specified in the flowchart and/or block diagram block or blocks.

The computer program instructions may also be loaded onto a computer, other programmable data processing apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

For the sake of description, first an introduction is given to an example of a specific application environment of the present disclosure. Causality analysis based on a Bayesian network may be applied in various application environments. For example, in an application environment for monitoring whether a control system in a specific area is abnormal, information (e.g., information collected at different time points) corresponding to a plurality of variables (e.g., temperature, humidity, . . . , at a specified location in a specific area and whether the control system is abnormal) may be collected, respectively. There is no limit to the number of variables p, but there may be several variables in a simple application environment, and the number of variables p may reach dozens or even more in a complex application environment.

Information corresponding to variables which is collected at one time point may be stored into one sample (a vector comprising p dimensions), and at this point information collected at n time points may be stored into n samples (here, the n samples may be referred to as a collected data set). Subsequently, the collected data set may be used as input to determine a causality between temperature, humidity and the like at various locations in the area and whether the control system is abnormal.

For the sake of description below, how to determine whether the control system is abnormal is used as a specific example for illustrating a determination of the causality in the context of the present disclosure. According to other implementations of the present disclosure, the technical solution of the present disclosure may be applied in more application environments. For example, in an application environment for determining a causality between sales of a specific product (e.g., beer) and variables (the price of beer, temperature, time, country and other information), a data set comprising sales and various other variables may be collected, and then the causality between sales of beer and other variables may be determined based on the data set. In another example, in an application environment for determining a causality between a car insurance premium and variables (e.g., the car's brand, model and airbag number, gender and age of the insurance applicant, etc.), a data set comprising the insurance premium and the various other variables may be collected, and then the causality between the insurance premium and the other variables may be determined based on the data set.

In the context of the present disclosure, the Bayesian network is used as one specific example of a causality to describe specific details of the present disclosure. Here, the Bayesian network is a graphical probabilistic network model defined based on a DAG. The DAG may be represented using a matrix. Specifically, suppose in the application environment for determining whether the control system is abnormal, there exist the following p variables: temperature, humidity, . . . , whether the control system is abnormal. At this point, a data set comprising n samples may be represented as Table 1.

TABLE 1

Example of Data Set

| Variable $x_1$ = temperature (° C.) | Variable $x_2$ = humidity (%) | ... | Variable $x_p$ = being abnormal (true/false) |
|---|---|---|---|
| T1 | M1 | ... | E1 |
| T2 | M2 | ... | E2 |
| ... | ... | ... | ... |
| Tn | Mn | ... | E3 |

As shown in Table 1, the first column "variable $x_1$=temperature" indicates that the first variable among p variables is "temperature," that is, temperature values measured at different time points. The second column "variable $x_2$=humidity" indicates that the second variable among p variables is "humidity," that is, humidity values measured at different time points. The last column "variable $x_p$=being abnormal" indicates that the $p^{th}$ variable among p variables is "being abnormal or not," that is, whether the control system is abnormal at different time points. Causalities between the above p variables may be represented using a matrix B as below.

$$B = \begin{bmatrix} \beta_{1,1} & \cdots & \beta_{1,p} \\ \vdots & \ddots & \vdots \\ \beta_{p,1} & \cdots & \beta_{p,p} \end{bmatrix}$$

For example, matrix B is a p-order matrix including p×p elements, each element indicates whether there is a causality between two variables corresponding to a location of the element. Specifically, the variable $\beta_{x,y}$ in the matrix B represents a causality between the variable x and the variable y among p variables. It should be noted that if locations of two variables differ, then causality also differs. Therefore, $\beta_{x,y}$ and $\beta_{y,x}$ represent different causalities. In other words, edges in the directed graph represented by the matrix B have different directions. Moreover, a diagonal in the matrix B represents causalities between each element and itself. However, there is no causality between a specific element and itself, a value of the element at the diagonal should be set to 0.

As seen from the above description, in the Bayesian network, the problem for determining a causality between p variables based on a collected data set may be converted into a procedure for solving a matrix describing causalities between a plurality of elements. By now technical solutions have been proposed to solve a matrix by building problem formulas based on a data set. However, on one hand, the precision of causality obtained by existing technical solutions is far from satisfactory; on the other hand, the calculation of existing technical solutions is quite complex, and when the number of variables increases, the amount of calculations will significantly increase. Therefore, existing technical solutions fail to achieve an accurate causality between a plurality of variables. In particular, when the number p of variables exceeds a given value, no calculation result will be obtained due to the excessive calculation amount.

It should be noted that technical solutions have been proposed to build a problem formula and solve the causality based on fitness and sparsity. However, when estimating a variable $x_j$ (j=1, . . . , p) that is under observed, based on different sets of optional variables, existing technical solutions show inconsistency in selecting a variable, and resulting parent sets of the observed variable $x_j$ vary (parent sets are inconsistent). Therefore, a search result is not the optimal result, which degrades the precision of causality learning.

In order to solve the drawbacks in the above technical solutions, according to one implementation of the present disclosure, a method is proposed for determining a causality between a plurality of variables. In the technical solution, during determination of the causality, a specific constraint on each vector among p vectors in a matrix is introduced into sparsity for the matrix describing the causality. Specifically, the constraint here is a constraint on each vector among the p vectors, and with respect to each vector, the constraint may separately control a part of sparsity associated with the vector in the causality.

Specifically, according to one implementation of the present disclosure, a method is proposed for determining a causality between a plurality of variables. The method comprises: in response to a data set of a plurality of samples associated with the plurality of variables being collected, obtaining a matrix describing the causality between the plurality of variables, each sample among the plurality of samples comprising data that corresponds to the plurality of variables; determining fitness associated with the causality and sparsity associated with the causality based on the data set and the matrix, where the sparsity comprises a constraint on each vector among a plurality of vectors in the matrix, the constraint corresponding to a variable among the plurality of variables; building a first problem formula, which describes the causality, according to the determined fitness and sparsity; and solving the built first problem formula so as to obtain a candidate result of the matrix.

Figure 2:
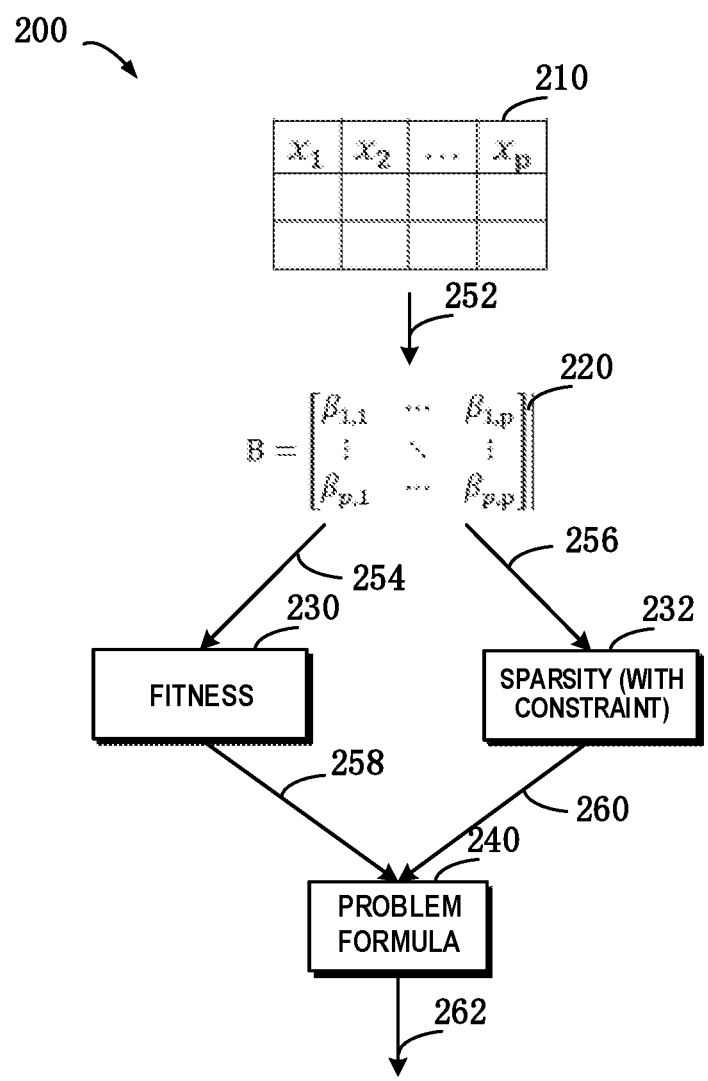
FIG. 2 schematically shows a block diagram for determining a causality between a plurality of variables according to one implementation of the present disclosure.

More details according to one implementation of the present disclosure will be described with reference to FIG. 2. This figure schematically shows a block diagram 200 for determining a causality between a plurality of variables according to one implementation of the present disclosure. As depicted, a data set 210 (e.g., the data set shown in Table 1) of a plurality of samples (n samples) associated with the plurality of variables may be collected. A matrix 220 (e.g., matrix B described above) describing the causality between the plurality of variables may be obtained (as shown by an arrow 252). Each sample among the plurality of samples comprises data that corresponds to the plurality of variables. At this point, values of various elements in the built matrix are unknown and may be obtained through a solving procedure below (as shown by an arrow 262).

As shown by arrows 254 and 256, fitness 230 associated with the causality and sparsity 232 associated with the causality are determined based on the data set 210 and the matrix 220. The sparsity 232 comprises a constraint on each vector among a plurality of vectors in the matrix, the constraint corresponding to a variable among the plurality of variables. As shown by arrows 258 and 260, a problem formula 240 describing the causality may be built based on the determined fitness 230 and sparsity 232. Finally, as shown by the arrow 262, the built problem formula 240 is built to obtain a candidate result of the matrix 220. At this point, the candidate result represents a specific value of each element in the matrix 220.

Figure 3:
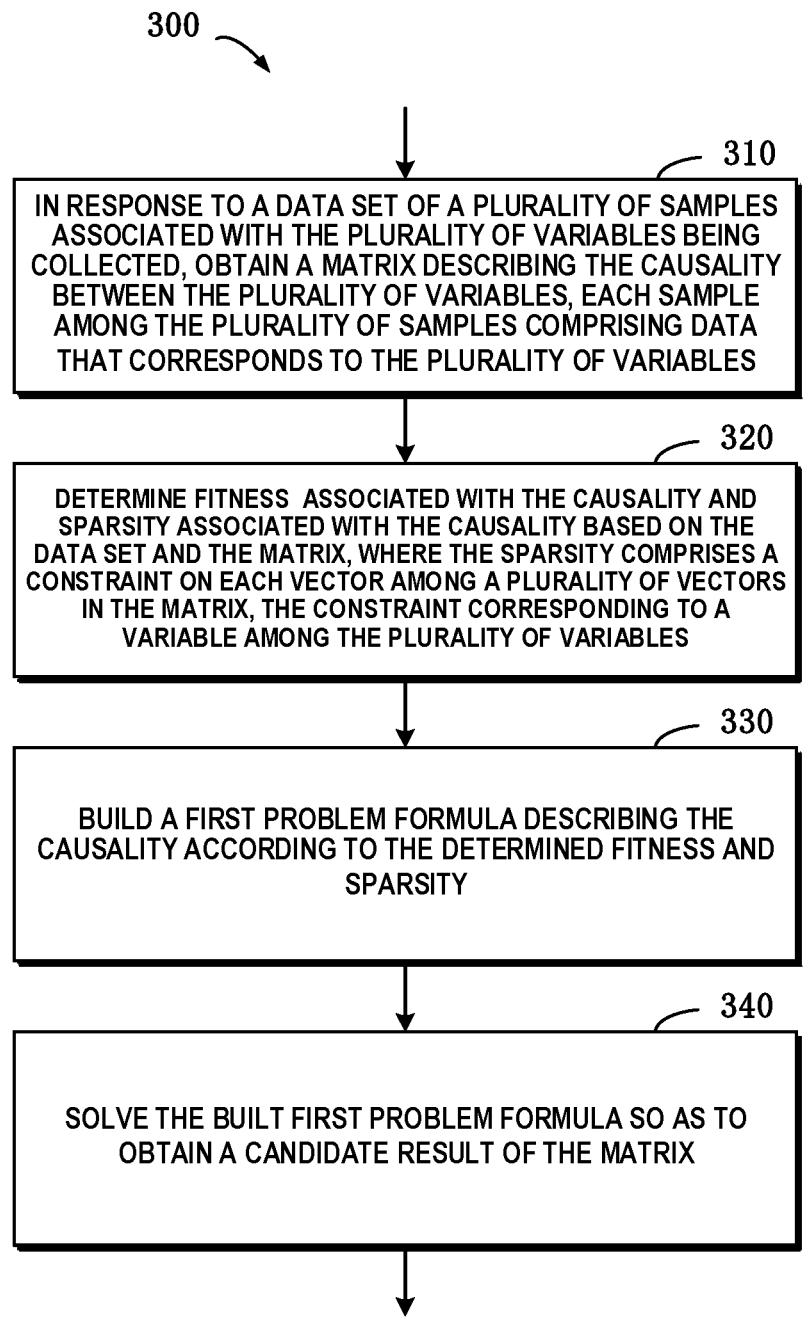
FIG. 3 schematically shows a flowchart of a method for determining a causality between a plurality of variables according to one implementation of the present disclosure.

FIG. 3 schematically shows a flowchart of a method 300 for determining a causality between a plurality of variables according to one implementation of the present disclosure. First, at block 310, in response to a data set 210 of a plurality of samples associated with the plurality of variables being collected, a matrix 220 describing the causality between the plurality of variables is obtained, each sample among the plurality of samples comprising data that corresponds to the plurality of variables.

Here, the data set 210 is a set of sample data which is collected in an application environment. For example, in the above application environment for determining whether a control system is abnormal, the data set 210 may be the data set shown in Table 1, where each row represents one sample. Each sample comprises measured values of p variables $x_1$, $x_2$, . . . , $x_p$. At this point, a matrix 220 (e.g., in the form of matrix B described above) describing a causality between the p variables may be obtained. It should be noted that the value of each element in the matrix 220 is unknown here, but it may be considered that values of variables are unknown numbers. In subsequent steps, a problem formula may be built and solved so as to obtain a candidate result of the matrix (i.e., the value of each element in the matrix). Since the causality between the plurality of variables is described by the matrix 220, the candidate result of the matrix represents the causality.

At block 320, fitness 230 associated with the causality and sparsity 232 associated with the causality are determined based on the data set 210 and the matrix 220, where the sparsity 232 comprises a constraint on each vector among a plurality of vectors in the matrix 220, the constraint corresponding to a variable among the plurality of variables.

The matrix 220 may be provided in the form of matrix B, where the matrix 220 may comprise p vectors each of which is as shown by one row in the matrix 220. For brevity of the description, specific details according to one implementation of the present disclosure will be illustrated by taking a three-dimensional matrix p=3 as a specific example of the matrix describing the causality. At this point, the data set 210 may be represented as Table 2.

TABLE 2

Example of Data Set

| Variable $x_1$ = temperature (° C.) | Variable $x_2$ = humidity (%) | Variable $x_3$ = being abnormal (true/false) |
|---|---|---|
| T1 | M1 | E1 |
| T2 | M2 | E2 |
| . . . | . . . | . . . |
| Tn | Mn | E3 |

When p=3, the matrix may be represented as:

$$M = \begin{bmatrix} 0 & \beta_{1,2} & \beta_{1,3} \\ \beta_{2,1} & 0 & \beta_{2,3} \\ \beta_{3,1} & \beta_{3,2} & 0 \end{bmatrix}$$

At this point, various vectors in matrix M are shown as below:
The first vector: $\beta_1=[0\ \beta_{1,2}\ \beta_{1,3}]$;
The second vector: $\beta_2=[\beta_{2,1}\ 0\ \beta_{2,3}]$;
The third vector: $\beta_3=[\beta_{3,1}\ \beta_{3,2}\ 0]$.

According to implementations of the present disclosure, the constraint includes a constraint on each vector among a plurality of vectors in the matrix 220. In other words, the constraint is on each of the above three vectors $\beta_1$, $\beta_2$ and $\beta_3$, respectively.

At block 330, a problem formula 240 describing the causality may be built according to the determined fitness 230 and sparsity 232. At block 340, the built problem formula 240 is solved so as to obtain a candidate result of the matrix 220. It should be noted that here the candidate result comprises values of various elements in the matrix 220. By means of the candidate result, the matrix 220 describing the causality between the plurality of variables may be obtained, and further a directed graph about relationships between variables may be obtained.

Since the matrix 220 comprises the plurality of vectors $\beta_1$, $\beta_2$ and $\beta_3$, fitness and sparsity may be determined for each vector, respectively. According to one implementation of the present disclosure, the first problem formula may be built using Formula 1 as below:

$$\min_{\beta_1,\ldots,\beta_p} \sum_{j=1}^{p} Fitness_j + Sparisity_j \qquad \text{Formula 1}$$

In Formula 1, $\beta_j$ represents a current vector among the plurality of vectors in the matrix, $Fitness_j$ and $Sparsityj$ represent the fitness and the sparsity for the current vector $\beta_j$. In this implementation, $Fitness_j$ and $Sparsityj$ are both associated with the current vector $\beta_j$. Formula 1 may be solved so as to obtain a value that causes the problem formula to have a minimum value, and value may be used as a candidate result of the current vector $\beta_j$. In this way, by solving with respect to each vector among the plurality of vectors in the matrix 220, values of various elements in the matrix 220 may be obtained.

Since the operation on each vector among the plurality of vectors is similar, one vector is taken as a specific example for describing details according to one implementation of the present disclosure. Specifically, with respect to the current vector $\beta_j$ among the plurality of vectors in the matrix 220, the fitness and the sparsity may be determined for the current vector $\beta_j$, respectively. At this point, the constraint comprises a constraint on the current vector.

According to one implementation of the present disclosure, the fitness and the sparsity may be calculated in various ways. For example, according to one implementation of the present disclosure, $Fitness_j$ and $Sparsityj$ for the current vector $\beta_j$ may be determined based on a 2-norm operation and a 1-norm operation, respectively. Specifically, $Fitness_j$ for the current vector $\beta_j$ may be determined based on Formula 2 as below:

$$Fitness_j = \|x_j - x_{-j}\beta_j\|_2^2 \qquad \text{Formula 2}$$

In Formula 2, $x_j$ represents a portion associated with the current vector $\beta_j$ among the plurality of samples in the data set 210, $x_{-j}$ represents a portion associated with vectors other than the current vector $\beta_j$ among the plurality of samples in the data set 210, $\beta_j$ represents the current vector, and $\|\ \|_2^2$ represents a 2-norm operation. For example, when j=1, $x_j$ represents values T1, T2, ..., Tn in the first column "variable $x_1$=temperature" in the data set shown by Table 1; and $x_{-j}$ represents values in columns other than the first column in the data set shown by Table 1 (e.g., M1, M2, ..., Mn in the second column "variable $x_2$=humidity", and E1, E2, ..., En in the p column "variable $x_p$=being abnormal").

In Formula 2, $\|x_j - x_{-j}\beta_j\|_2^2$ represents fitness associated with the current vector $\beta_j$, here the fitness indicating a fitting relationship between the current column and another column in the matrix. The fitness is denoted in a 2-norm form, which may represent the fitting degree between $x_j$ and $x_{-j}\beta_j$. The smaller the value of $\|x_j - x_{-j}\beta_j\|_2^2$ is, the higher the fitness is between them; and vice versa, a higher value indicates a lower fitness.

According to one implementation of the present disclosure, $Sparsity_j$ for the current vector $\beta_j$ may be determined based on Formula 3 as below:

$$Sparisity_j = \lambda_j \|\beta_j\|_1 \qquad \text{Formula 3}$$

In Formula 3, $\beta_j$ represents the current vector, $\|\ \|_1$ represents a 1-norm operation, $\lambda_j$ represents a constraint on the current vector $\beta_j$ among the plurality of vectors in the matrix 220, a value of the constraint may correspond to a variable among the plurality of variables. It should be noted that by setting specific constraints for various vectors, the sparsity of each vector in the matrix 220 may be separately adjusted, so the inconsistency problem in selecting a variable in the prior art may be solved. It is understood that here the sparsity (i.e., the number of relationships in the causality) represents sparsity of a non-zero element in the matrix. Therefore, by controlling the size of $\lambda_j$, it is possible to separately control the sparsity associated with each current vector $\beta_j$.

According to one implementation of the present disclosure, based on the above Formulae 1-3, the first problem formula may be built using Formula 4 as below:

$$\min_{\beta_1,\ldots,\beta_p} \sum_{j=1}^{p} \|x_j - x_{-j}\beta_j\|_2^2 + \lambda_j\|\beta_j\|_1 \qquad \text{Formula 4}$$

In Formula 4, $\beta_j$ represents the current vector, $x_j$ represents a portion associated with the current vector $\beta_j$ among the plurality of samples, $x_{-j}$ represents a portion associated with vectors other than the current vector $\beta_j$ among the plurality of samples, $\|\ \|_2^2$ represents a 2-norm operation, $\lambda_j$ represents a constraint on the current vector $\beta_j$ among the plurality of vectors in the matrix, and $\|\ \|_1$ represents a 1-norm operation. It should be noted that according to one implementation of the present disclosure, each vector $\beta_j$ in the matrix may be processed separately, so as to obtain specific values of various elements in corresponding $\beta_j$.

According to one implementation of the present disclosure, the constraint on the current vector $\beta_j$ may further comprise a weight vector. Specifically, in order to determine the sparsity for the current vector, first, a weight vector in the constraint on the current vector may be determined; subsequently, the sparsity for the current vector may be determined based on the determined weight vector and the current vector.

Specifically, the sparsity for the current vector may be determined based on Formula 5 as below:

$$\text{Sparsity}_j = \|w_j \odot \beta_j\|_1 \quad \text{Formula 5}$$

In Formula 5, $w_j$ represents a weight vector, $\odot$ represents a dot-product operation, and represents a $\|\ \|_1$ 1-norm operation. It should be noted that in this formula, $w_j$ has dimensions matching the current vector $\beta_j$. According to one implementation of the present disclosure, since the current vector $\beta_j$ is a 1×p dimensional vector, the weight vector $w_j$ may be provided in the form of a 1×p dimensional vector. According to another implementation of the present disclosure, since the current vector $\beta_j$ comprises an element "0" at the diagonal, a result at a location corresponding to the element "0" is also "0" after a dot-product operation. At this point, the weight vector $w_j$ may be provided in the form of a 1×(p−1) dimensional vector, where p−1 elements are subjected to a dot-product operation with elements at locations other than the diagonal in the current vector $\beta_j$.

According to one implementation of the present disclosure, the weight vector $w_j$ for the current vector $\beta_j$ may be determined based on an empirical value or a predetermined value. According to one implementation of the present disclosure, a specific value of the weight vector $w_j$ may be iteratively determined by building and solving a problem formula.

Figure 4:
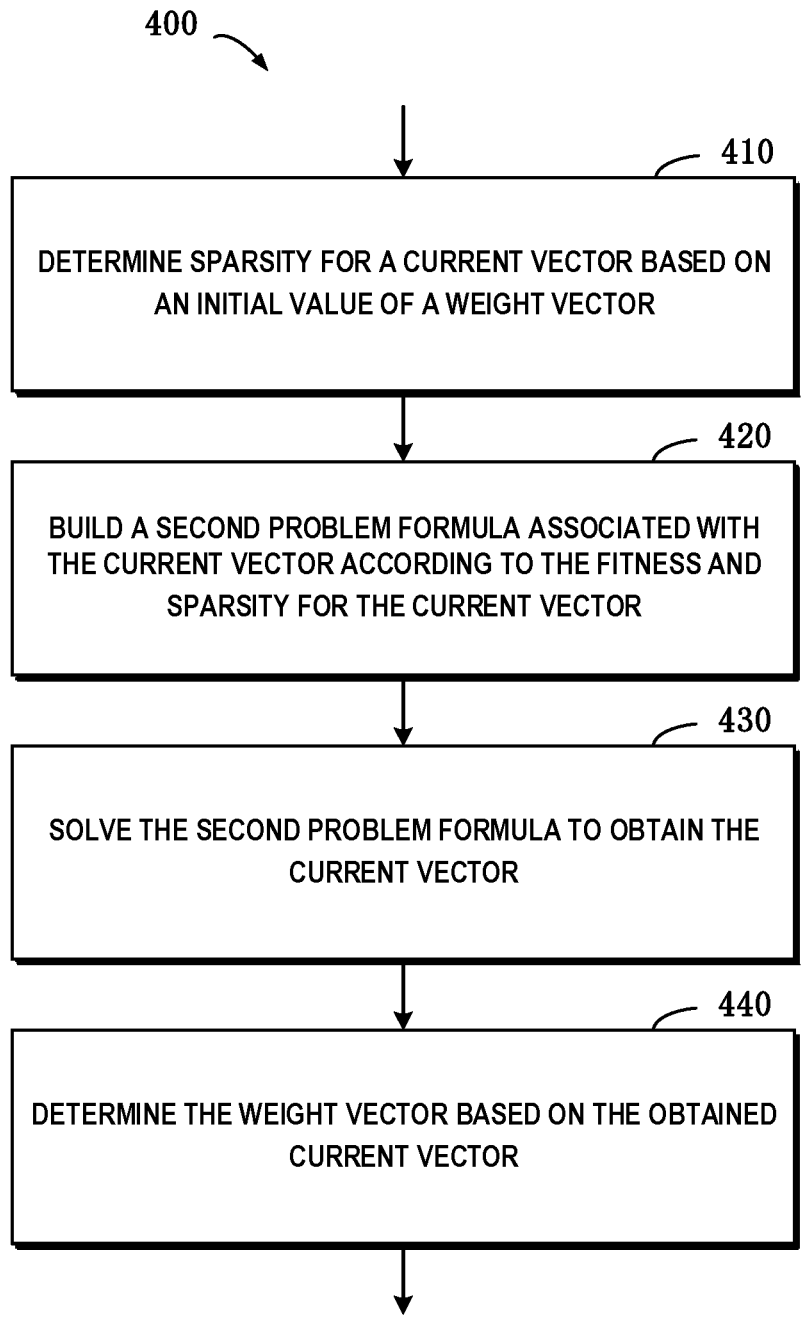
FIG. 4 schematically shows a flowchart of a method for determining a weight vector according to one implementation of the present disclosure.

According to one implementation of the present disclosure, an initial value may be set for the weight vector, and the desired weight vector may be iteratively obtained in a plurality of rounds. Description is presented below on how to determine the weight vector with reference to FIG. 4. This figure schematically shows a flowchart of a method 400 for determining the weight vector according to one technical solution. At block 410, sparsity for the current vector $\beta_j$ may be determined based on a predetermined initial value of the weight vector $w_j$ for the current vector $\beta_j$. For example, Sparsity for the current vector $\beta_j$ may be determined based on the above Formula 5. Alternatively, Sparsity for the current vector $\beta_j$ may further be determined based on another formula in the prior art.

Next, at block 420, a second problem formula associated with the current vector may be built according to the fitness and sparsity for the current vector. At block 430, the second problem formula is solved so as to obtain the current vector. In this step, a solving method (e.g., LASSO method) in the prior art may be used to solve the current vector $\beta_j$. Finally, at block 440, the weight vector $w_j$ is determined based on the obtained current vector $\beta_j$.

According to one implementation of the present disclosure, the initial value of the weight vector may be determined using different methods. For example, a predetermined initial value may be specified; alternatively, the initial value may be determined based on a least square operation associated with the current vector $\beta_j$. As described above, the weight vector may comprise a plurality of (e.g., p or p−1) elements, a value of each element may be determined one by one so as to obtain the final initial value. At this point, various elements in the initial value of the weight vector may be determined based on various elements in the current vector $\beta_j$. According to one implementation of the present disclosure, a corresponding element in the weight vector $w_j$ may be determined based on a least square operation associated with a specific element in the current vector $\beta_j$. Specifically, let $w_{j,d}^{ini}$ denote the $d^{th}$ element in the initial value, and then the $d^{th}$ element $w_{j,d}^{ini}$ in the initial value may be determined based on the following formula:

$$w_{j,d}^{ini} = \frac{|\beta_{j,d}(ols)|}{\|\beta_j(ols)\|_1}, \text{ where} \quad \text{Formula 6}$$

$$\beta_j(ols) = (x_{-j}^T x_{-j})^{-1} x_{-j}^T x_j$$

In Formula 6, $\beta^3$ represents the current vector, $\beta_{j,d}$ represents the $d^{th}$ element in the current vector $\beta_j$, $\beta_{j,d}(ols)$ represents a least square operation, $|\ |$ represents an absolute value operation, $\|\ \|_1$ represents a 1-norm operation, $x_j$ represents a portion associated with the current vector $\beta_j$ among the plurality of samples, $x_{-j}$ represents a portion associated with vectors other than the current vector $\beta_j$ among the plurality of samples, T represents a transpose operation, j=1, . . . , p, and p represents the number of the plurality of variables.

According to one implementation of the present disclosure, a corresponding element in the weight vector may be determined based on an element in the obtained current vector. Specifically, the $d^{th}$ element in the weight vector $w_j$ may be determined based on the $d^{th}$ element in the obtained current vector $\beta_j$.

According to one implementation of the present disclosure, the $d^{th}$ element $w_{j,d}$ in the weight vector $w_j$ may be determined based on the following formula:

$$w_{j,d} = \frac{|\beta_{j,d}|^{\frac{1}{1+\gamma}}}{\|\text{abs}(\beta_j)^{\frac{1}{1+\gamma}}\|_1} \quad \text{Formula 7}$$

In Formula 7, $\beta_{j,d}$ represents the $d^{th}$ element in the solved current vector $\beta_j$, $\gamma$ represents a predetermined parameter, and abs ( ) represents an absolute value operation. According to one implementation of the present disclosure, the element $w_{j,d}$ may further be determined based on Formula 8 or another formula.

$$w_{j,d} = \frac{|\beta_{j,d}|}{\|\text{abs}(\beta_j)\|_1} \quad \text{Formula 8}$$

How to iteratively determine the weight vector in the constraint has been described above. The constraint may further comprise another adjustment parameter, so that various vectors in the matrix may further be adjusted. According to one implementation of the present disclosure, Sparsity$_j$ for the current vector $\beta_j$ may be determined as below:

$$\text{Sparsity}_j = \|w_j^{-\gamma} \odot \beta_j\|_1 \quad \text{Formula 9}$$

In Formula 9, $\beta_j$ represents the current vector, $w_j$ represents the weight vector for the current vector $\beta_j$, $\gamma$ represents a predetermined parameter, and $\odot$ represents a dot-product operation.

According to one implementation of the present disclosure, the above weight coefficient $\lambda_j$ and weight vector $w_j$ may be combined so as to obtain Sparsity$_j$ for the current vector $\beta_j$. Specifically, Sparsity$_j$ for the current vector $\beta_j$ may be determined based on, for example, Formula 10 and Formula 11 as below:

$$\text{Sparsity}_j = \lambda_j \|w_j \odot \beta_j\|_1 \quad \text{Formula 10}$$

$$\text{Sparsity}_j = \lambda_j \|w_j^{-\gamma} \odot \beta_j\|_1 \quad \text{Formula 11}$$

In Formula 10 and Formula 11, $\lambda_j$ represents a weight coefficient in the constraint on the current vector $\beta_j$, $w_j$ represents the weight vector for the current vector $\beta_j$, $\gamma$ represents a predetermined parameter, and $\odot$ represents a dot-product operation.

How to build the problem formula has been described above based on the fitness and the sparsity. According to the above formulae for determining the fitness, the first problem formula may be built based on any of Formulae 12-15 as below:

$$\min_{\beta_1,\ldots,\beta_p} \sum_{j=1}^{p} \|x_j - x_{-j}\beta_j\|_2^2 + \lambda_j\|\beta_j\|_1 \qquad \text{Formula 12}$$

$$\min_{\beta_1,\ldots,\beta_p} \sum_{j=1}^{p} \|x_j - x_{-j}\beta_j\|_2^2 + \|w_j \odot \beta_j\|_1 \qquad \text{Formula 13}$$

$$\min_{\beta_1,\ldots,\beta_p} \sum_{j=1}^{p} \|x_j - x_{-j}\beta_j\|_2^2 + \|w_j^{-\gamma} \odot \beta_j\|_1 \qquad \text{Formula 14}$$

$$\min_{\beta_1,\ldots,\beta_p} \sum_{j=1}^{p} \|x_j - x_{-j}\beta_j\|_2^2 + \lambda_j\|w_j^{-\gamma} \odot \beta_j\|_1 \qquad \text{Formula 15}$$

In Formulae 12-15, p represents the number of the plurality of variables, $\|x_j-x_{-j}^{\beta_j}\|_2^2$ represents the fitness for the current vector $\beta_j$, where $\beta_j$ represents the current vector, $\|\ \|_2^2$ represents a 2-norm operation, $x_j$ represents a portion associated with the current vector $\beta_j$ among the plurality of samples, $x_{-j}$ represents a portion associated with vectors other than the current vector $\beta_j$ among the plurality of samples, $\|\ \|_1$ represents a 1-norm operation, $\lambda_j$ represents a weight coefficient in the constraint on the current vector $\beta_j$, $w_j$ represents the weight vector for the current vector $\beta_j$, $\gamma$ represents a predetermined parameter, and $\odot$ represents a dot-product operation.

Based on the above described method, since various variables are at equivalent locations during solving the matrix, a circular causality may occur in the resulting matrix. For example, if both elements $\beta_{x,y}$ and $\beta_{y,x}$ in the matrix are larger than zero, this means that a circular causality exists between two variables. In other words, a "cycle" exists in the causal network.

According to the context of the present disclosure, since it is desirable to describe the determined causality as a directed acyclic graph, a constraint condition may be set so as to eliminate the circular causality. Detailed description is presented below on how to eliminate the circular causality with reference to figures.

For the sake of description, a score formula associated with the $j^{th}$ node in the directed graph may be defined based on the above Formula 15.

$$WeightedL1Score(x_j \mid V \setminus x_j) = \qquad \text{Formula 16}$$
$$\min_{\beta_j} \|x_j - x_{-j}\beta_j\|_2^2 + \lambda_j\|w_j^{-\gamma} \odot \beta_j\|_1$$

In Formula 16, WeightedL1Score($x_j|V\setminus x_j$) represents a score for a condition probability "$(x_j|V\setminus x_j)$", and $V\setminus x_j$ represents variables other than $x_j$ among all variables. For the sake of description, Formula 16 may be abbreviated as WLS( ).

According to one implementation of the present disclosure, a causal sequence may be built by selecting a variable from the plurality of variables one by one in a plurality of rounds, and further a cycle in the directed graph may be eliminated through causalities in the causal sequence. Here, the causal sequence may comprise a plurality of variables which are sequentially ordered. In order to describe the concept of causal sequence more clearly, a data set comprising 5 variables will be taken as an example. For example, the data set may comprise 5 variables (variable $x_1$=temperature, variable $x_2$=humidity, variable $x_3$=air quality, variable $x_4$=light intensity, variable $x_5$=being abnormal). For example, a causal sequence may be shown as: $\{x_1, x_2, x_5\}$. This causal sequence indicates that the temperature determines the humidity and then the humidity determines whether the control system is abnormal.

Figure 5:
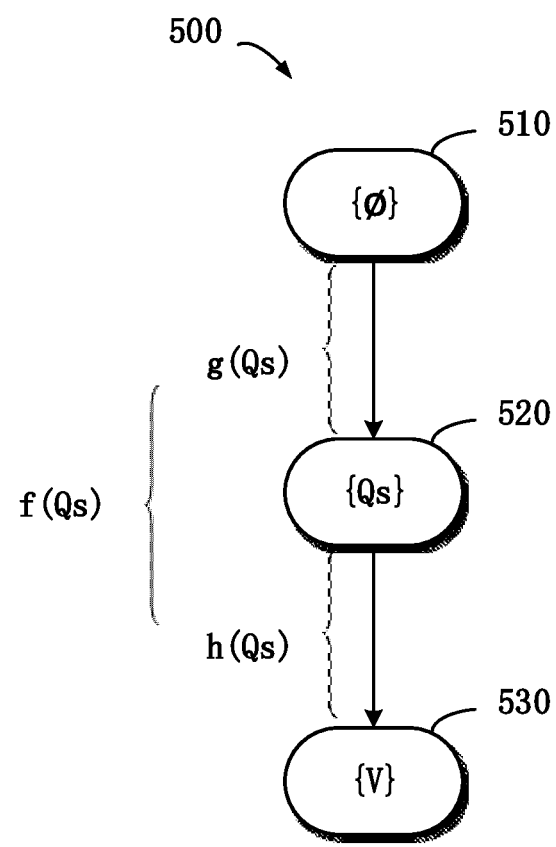
FIG. 5 schematically shows a block diagram for determining a score for reaching a target state from one state associated with a causal sequence according to one implementation of the present disclosure.

FIG. 5 schematically shows a block diagram 500 for determining a score for reaching a target state from one state associated with a causal sequence according to one implementation of the present disclosure. It should be noted that based on basic principles of causal inference, suppose a current causal sequence is $Q_s$, and a state associated with the causal sequence $Q_s$ is as shown by a node 520. At this point, a score for reaching a target state (e.g., as shown by a node 530, the state is associated with a causal sequence comprising all variables) from the state associated with the current causal sequence $Q_s$ may be calculated according to a formula as below:

$$f(Q_s) = g(Q_s) + h(Q_s) \qquad \text{Formula 17}$$

In Formula 17, $f(Q_s)$ denotes a score for reaching the target state from the state associated with the current causal sequence $Q_s$, $g(Q_s)$ denotes a score for reaching the state associated with the current causal sequence $Q_s$ (as shown by the node 520) from an initial state (a null set as shown by a node 510), and $h(Q_s)$ denotes a predicted score for reaching the target state from the state associated with the current causal sequence $Q_s$.

According to one implementation of the present disclosure, a causal sequence may be built based on at least one variable among the plurality of variables; subsequently, based on the causal sequence being used as a constraint condition, the first problem formula may be solved so as to cause a directed graph represented by the candidate result to be a directed acyclic graph. Specifically, during building the causal sequence, in a first round, one variable may be selected from the plurality of variables and may be added to the causal sequence. In a second round, a variable may be selected from the remaining variables and may be added to the causal sequence, and so on and so forth, till the causal sequence comprises a universal set of the plurality of variables. Therefore, since any variable occurs at most once in the causal sequence, a directed acyclic graph may be generated by using the first problem formula based on the causality as a constraint.

For the sake of description, an application environment comprising 5 variables $x_1$, $x_2$, $x_3$, $x_4$ and $x_5$ will be taken as an example for description. Initially, the causal sequence is null, and variables $x_1$, $x_2$, $x_3$, $x_4$ and $x_5$ may be added to the causal sequence to form causal sequences $\{x_1\}$, $\{x_2\}$, $\{x_3\}$, $\{x_4\}$ and $\{x_5\}$, respectively. Furthermore, variables other than an existing variable may be added to each causal sequence. Then, the score for reaching a target state from a state associated with each causal sequence may be determined based on the above formula.

According to one implementation of the present disclosure, a score associated with a new causal sequence $Q_s'=Q_s\cup\{x_j\}$ formed by adding a next variable $x_j$ to the current causal sequence $Q_s$ may be determined based on Formula 18 and Formula 19.

$$h(x_j) = \sum_{x_i, x_i \in V/Q_2'} WeightedL1Score(x_i \mid V/\{x_i\}) \quad \text{Formula 18}$$

$$g(x_i) = \sum_{x_i \in Q_s'} WeightedL1Score\left(x_i \mid \Pi_{p \ni x_i}^{Q_s'}\right) \quad \text{Formula 19}$$

In Formula 18, $x_i \in V/Q_s'$ represents that $x_i$ belongs to a portion other than $Q_s'$ in the universal set. In Formula 19, $x_i \in Q_s'$ represents that $x_i$ belongs to $Q_s'$, and $$\Pi_{<x_i}^{Q_s'}$$

indicates a set of variables that belong to $Q_s'$ and located before the variable $x_i$.

In this implementation, calculation may be performed based on the above formulae. Suppose in one round, the current causal sequence $Q_s = \{x_1, x_3\}$, and the next variable to be added is $x_j = x_2$. At this point, $h(x_{j=2})$ represents a score where variables $x_4$ and $x_5$ have not been considered, and the score is:

$$h(x_{j=2}) = WLS(x_4 \mid \{x_1, x_2, x_3, x_5\}) + WLS(x_5 \mid \{x_1, x_2, x_3, x_4\}) \quad \text{Formula 20}$$

At this point, $g(x_{j=2})$ represents that a score where variables $x_1$, $x_3$ and $x_2$ have been considered, and the score is:

$$g(x_{j=2}) = WLS(x_1 \mid \{\emptyset\}) + WLS(x_3 \mid \{x_1\}) + WLS(x_2 \mid \{x_1, x_1\}) \quad \text{Formula 21}$$

Figure 6:
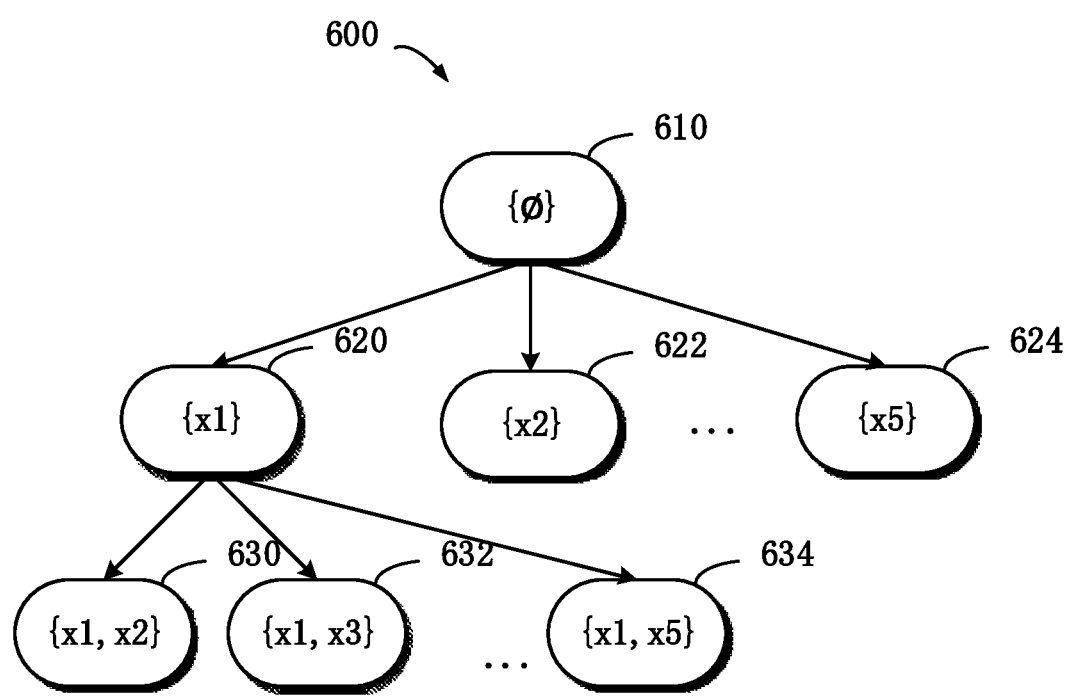
FIG. 6 schematically shows a block diagram of gradually adding a variable to a causal sequence according to one implementation of the present disclosure.

With reference to FIG. 6, description is presented on how to gradually determine a causal sequence in a plurality of rounds. FIG. 6 schematically shows a block diagram 600 of adding variables to a causal sequence according to one implementation of the present disclosure. As depicted, initially the causal sequence $Q_s$ is a null set (as shown by a node 610). Subsequently, various variables may be added to the causal sequence $Q_s$. Suppose only one variable is added in a first round, then at this point the following five causal sequences may be obtained: $\{x_1\}, \{x_2\}, \ldots, \{x_5\}$ (as shown by nodes 620, 622, ..., 624 in FIG. 6). Corresponding scores calculated according to Formulae 17-19 are $f(x_1)$, $f(x_2)$, $f(x_3)$, $f(x_4)$ and $f(x_5)$, respectively.

Based on the above description, a minimum value may be selected from the above five scores (suppose the minimum value is $f(x_1)$). Subsequently, another variable is added to the causal sequence that comprises $x_1$ so as to update the causal sequence, and then new causal sequences are obtained: $\{x_1, x_2\}, \{x_1, x_3\}, \{x_1, x_4\}$ and $\{x_1, x_5\}$ (as shown by nodes 630, 632, 634 and 636 in FIG. 6). Next, scores associated with these new causal sequences may be calculated: $f(x_1, x_2)$, $f(x_1, x_3)$, $f(x_1, x_4)$ and $f(x_1, x_5)$. A minimum value is selected from the scores $f(x_1, x_2)$, $f(x_1, x_3)$, $f(x_1, x_4)$, $f(x_1, x_5)$, $f(x_j)$, $f(x_2)$, $f(x_3)$, $f(x_4)$ and $f(x_5)$, and so on and so forth, till a final universal set is obtained.

According to the above principles, a causal sequence may be constantly constructed from a null set, and a final causal sequence associated with the minimum score may be obtained. Since directions of directed edges in the final causal sequence are determined according to the ordering of various variables in the sequence, the circular causality in the matrix may be eliminated based on the final causal sequence.

According to one implementation of the present disclosure, the matrix already comprises a causality between any two variables among the plurality of variables. Therefore, when adding another variable to a causal sequence, a variable having a causality with the last variable in the causal sequence may be searched for in the matrix, and only the found variable may be added to the causal sequence. Specifically, regarding a first variable in the causal sequence, a second variable having a causality with the first variable is selected from the candidate result of the matrix; and the selected second variable is added to the causal sequence as a successor of the first variable. In this way, not all other variables need to be added to the causal sequence, and then the computation complexity is greatly reduced. Where there are a large number of variables, this approach can more effectively lower the computational complexity.

Specifically, suppose there exist p variables, and at this point a causal sequence is $\{x_1\}$. According to the traditional technical solution, all other p-1 variables need to be added to the causal sequence, respectively. At this point, updated p-1 causal sequences are $\{x_1, x_2\}, \{x_1, x_3\}, \ldots, \{x_1, x_p\}$. Suppose a resulting matrix indicates that there is only one causality between $x_i$ and $x_2$, then at this point $x_2$ may be added to the end of the causal sequence $\{x_1\}$ only, and the updated causal sequence becomes $\{x_1, x_2\}$. Compared with the prior art that performs computation on p-1 causal sequences $\{x_1, x_2\}, \{x_1, x_3\}, \ldots, \{x_1, x_p\}$, according to one implementation of the present disclosure, computation is only performed on one causal sequence $\{x_1, x_2\}$, thereby greatly lowering the computational complexity and reducing time overheads.

Figure 7:
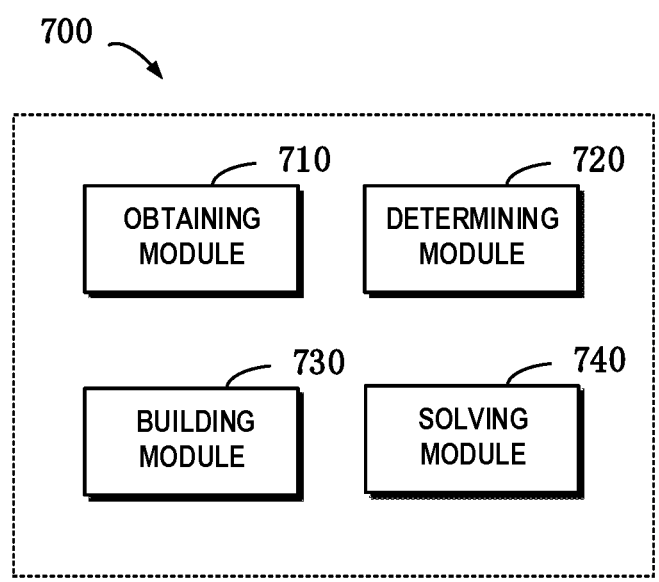
FIG. 7 schematically shows a block diagram of a device for determining a causality between a plurality of variables according to one implementation of the present disclosure.

FIG. 7 schematically shows a block diagram of an apparatus 700 for determining a causality between a plurality of variables according to one implementation of the present disclosure. The apparatus 700 is provided for determining a causality between a plurality of variables, comprising: an obtaining module 710 configured to, in response to a data set of a plurality of samples associated with the plurality of variables being collected, obtain a matrix describing the causality between the plurality of variables, each sample among the plurality of samples comprising data that corresponds to the plurality of variables; a determining module 720 configured to determine fitness associated with the causality and sparsity associated with the causality based on the data set and the matrix, where the sparsity comprises a constraint on each vector among a plurality of vectors in the matrix, the constraint corresponding to a variable among the plurality of variables; a building module 730 configured to build a first problem formula describing the causality according to the determined fitness and sparsity; and a solving module 740 configured to solve the built first problem formula so as to obtain a candidate result of the matrix.

According to one implementation of the present disclosure, the determining module 720 is further configured to, with respect to a current vector among a plurality of vectors in the matrix, determine fitness and sparsity for the current vector.

According to one implementation of the present disclosure, the determining module 720 is further configured to: determine a weight vector in the constraint on the current vector; and determine the sparsity for the current vector based on the determined weight vector and the current vector.

According to one implementation of the present disclosure, the determining module 720 is further configured to: determine sparsity for the current vector based on an initial value of the weight vector; build a second problem formula associated with the current vector according to the fitness for the current vector and the sparsity for the current vector;

solve the second problem formula so as to obtain the current vector; and determine the weight vector based on the obtained current vector.

According to one implementation of the present disclosure, the determining module 720 is further configured to determine the initial value of the weight vector.

According to one implementation of the present disclosure, the determining module 720 is further configured to determine the initial value based on a least square operation associated with the current vector.

According to one implementation of the present disclosure, the determining module 720 is further configured to determine the $d^{th}$ element $w_{j,d}^{ini}$ in the initial value based on the following formula:

$$w_{j,d}^{ini} = \frac{|\beta_{j,d}(ols)|}{\|\beta_j(ols)\|_1}, \beta_j(ols) = (x_{-j}^T x_{-j})^{-1} x_{-j}^T x_j,$$

where $\beta_j$ represents the current vector, $\beta_{j,d}$ represents the $d^{th}$ element in the current vector $\beta_j$, $\beta_{j,d}(ols)$ represents a least square operation, | | represents an absolute value operation, $\|\ \|_1$ represents a 1-norm operation, $x_j$ represents a portion associated with the current vector $\beta_j$ among the plurality of samples, $x_{-j}$ represents a portion associated with vectors other than the current vector $\beta_j$ among the plurality of samples, T represents a transpose operation, j=1, . . . , p, and p represents the number of the plurality of variables.

According to one implementation of the present disclosure, the determining module 720 is further configured to determine a corresponding element in the weight vector based on an element in the obtained current vector.

According to one implementation of the present disclosure, the determining module 720 is further configured to determine the $d^{th}$ element $w_{j,d}$ in the weight vector $w_j$ based on the following formula:

$$w_{j,d} = \frac{|\beta_{j,d}|^{\frac{1}{1+\gamma}}}{\left\|abs(\beta_j)^{\frac{1}{1+\gamma}}\right\|_1},$$

where $\beta_{j,d}$ represents the $d^{th}$ element in the current vector $\beta_j$, $\gamma$ represents a predetermined parameter, and abs ( ) represents an absolute value operation.

According to one implementation of the present disclosure, the determining module 720 is further configured to determine the sparsity $Sparsity_j$ for the current vector $\beta_j$ based on: $Sparsity_j = \|w_j \odot \beta_j\|_1$, where $\odot$ represents a dot-product operation.

According to one implementation of the present disclosure, the determining module 720 is further configured to determine the sparsity $Sparsity_j$ for the current vector $\beta_j$ based on:

$Sparsity_j = \|w_j^{-\gamma} \odot \beta_j\|_1$, where $\odot$ represents a dot-product operation.

According to one implementation of the present disclosure, the determining module 720 is further configured to: determine a weight coefficient $\lambda_j$ in the constraint on the current vector; and the determining the sparsity for the current vector comprises determining the sparsity $Sparsity_j$ for the current vector $\beta_j$ based on:

$Sparsity_j = \lambda_j \|w_j^{-\gamma} \odot \beta_j\|_1$, where $\odot$ represents a dot-product operation.

According to one implementation of the present disclosure, the building module 730 is further configured to build the first problem formula based on:

$$\min_{\beta_1,\ldots,\beta_p} \sum_{j=1}^{p} \|x_j - x_{-j}\beta_j\|_2^2 + Sparsity_j$$

where p represents the number of the plurality of variables, $x_j$ represents a portion associated with the current vector $\beta_j$ among the plurality of samples, $x_{-j}$ represents a portion associated with vectors other than the current vector $\beta_j$ among the plurality of samples, $\|x_j - x_{-j}\beta_j\|_2^2$ represents the fitness for the current vector $\beta_j$, $\|\ \|_2^2$ represents a 2-norm operation, and $Sparsity_j$ represents the sparsity for the current vector $\beta_j$.

According to one implementation of the present disclosure, the building module is further configured to: build a causal sequence based on at least one variable among the plurality of variables; and the solving problem is further configured to: solve the first problem formula based on the causal sequence as a constraint condition, so that a directed graph represented by the candidate result is a directed acyclic graph.

According to one implementation of the present disclosure, the building module is further configured to: with respect to a first variable in the causal sequence, select a second variable that has a causality with the first variable from the candidate result of the matrix; and add the selected second variable to the causal sequence as a successor of the first variable.

According to one implementation of the present invention, a system is provided for determining a causality between a plurality of variables, the system comprising: one or more processors; a memory coupled to at least one processor of the one or more processors; computer program instructions stored in the memory which, when executed by the at least one processor, cause the system to execute a method for determining a causality between a plurality of variables. The method comprises: in response to a data set of a plurality of samples associated with the plurality of variables being collected, obtaining a matrix describing the causality between the plurality of variables, each sample among the plurality of samples comprising data that corresponds to the plurality of variables; determining fitness associated with the causality and sparsity associated with the causality based on the data set and the matrix, where the sparsity comprises a constraint on each vector among a plurality of vectors in the matrix, the constraint corresponding to a variable among the plurality of variables; building a first problem formula describing the causality according to the determined fitness and sparsity; and solving the built first problem formula so as to obtain a candidate result of the matrix.

According to one implementation of the present disclosure, determining the fitness and the sparsity comprises: with respect to a current vector among a plurality of vectors in the matrix, determining fitness and sparsity for the current vector; and where the constraint comprises a constraint on the current vector, and determining the sparsity for the current vector comprises: determining a weight vector in the constraint on the current vector; and determining the sparsity for the current vector based on the determined weight vector and the current vector.

According to one implementation of the present disclosure, determining the weight vector comprises: determining sparsity for the current vector based on an initial value of the weight vector; building a second problem formula associated with the current vector according to the fitness for the current vector and the sparsity for the current vector; solving the second problem formula so as to obtain the current vector; and determining the weight vector based on the obtained current vector.

According to one implementation of the present disclosure, the method further comprises: determining the initial value of the weight vector, which comprises determining the initial value based on a least square operation associated with the current vector.

According to one implementation of the present disclosure, determining the initial value based on the least square operation associated with the current vector comprises: determining the $d^{th}$ element $w_{j,d}^{ini}$ in the initial value based on the following formula:

$$w_{j,d}^{ini} = \frac{|\beta_{j,d}(ols)|}{\|\beta_j(ols)\|_1}, \beta_j(ols) = (x_{-j}^T x_{-j})^{-1} x_{-j}^T x_j,$$

where $\beta_j$ represents the current vector, $\beta_{j,d}$ represents the $d^{th}$ element in the current vector $\beta_j$, $\beta_{j,d}$ (ols) represents a least square operation, | | represents an absolute value operation, $\| \|_1$ represents a 1-norm operation, $x_j$ represents a portion associated with the current vector $\beta_j$ among the plurality of samples, $x_{-j}$ represents a portion associated with vectors other than the current vector $\beta_j$ among the plurality of samples, T represents a transpose operation.

According to one implementation of the present disclosure, determining the weight vector based on the current vector comprises: determining a corresponding element in the weight vector based on an element in the obtained current vector.

According to one implementation of the present disclosure, determining the corresponding element in the weight vector based on the element in the obtained current vector comprises: determining the $d^{th}$ element $w_{j,d}$ in the weight vector $w_j$ based on the following formula:

$$w_{j,d} = \frac{|\beta_{j,d}|^{\frac{1}{1+\gamma}}}{\|abs(\beta_j)^{\frac{1}{1+\gamma}}\|_1},$$

where $\beta_{j,d}$ represents the $d^{th}$ element in the current vector $\beta_j$, $\gamma$ represents a predetermined parameter, and abs ( ) represents an absolute value operation.

According to one implementation of the present disclosure, determining the sparsity for the current vector comprises: determining the sparsity $Sparsity_j$ for the current vector $\beta_j$ based on $Sparsity_j = \|w_j \odot \beta_j\|_1$, where $\odot$ represents a dot-product operation.

According to one implementation of the present disclosure, determining the sparsity for the current vector comprises: determining the sparsity $Sparsity_j$ for the current vector $\beta_j$ based on $Sparsity_j = \|w_j^{-\gamma} \odot \beta_j\|_1$, where $\odot$ represents a dot-product operation.

According to one implementation of the present disclosure, determining the sparsity for the current vector further comprises: determining a weight coefficient $\lambda_j$ in the constraint on the current vector; and the determining the sparsity for the current vector comprises determining the sparsity $Sparsity_j$ for the current vector $\beta$ based on $Sparsity_j = \lambda_j \|w_j^{-\gamma} \odot \beta_j\|_1$, where $\odot$ represents a dot-product operation.

According to one implementation of the present disclosure, building the first problem formula comprises: building the first problem formula based on $$\min_{\beta_1,\ldots,\beta_p} \sum_{j=1}^{p} \|x_j - x_{-j}\beta_j\|_2^2 + Sparsity_j$$

where p represents the number of the plurality of variables, $x_j$ represents a portion associated with the current vector $\beta_j$ among the plurality of samples, $x_{-j}$ represents a portion associated with vectors other than the current vector $\beta_j$ among the plurality of samples, $\|x_j - x_{-j}\beta_j\|_2^2$ represents the fitness for the current vector $\beta_j$, $\| \|_2^2$ represents a 2-norm operation, and $Sparsity_j$ represents the sparsity for the current vector $\beta_j$.

According to one implementation of the present disclosure, building the first problem formula describing the causality further comprises: building a causal sequence based on at least one variable among the plurality of variables; and solving the first problem formula so as to obtain a candidate result of the matrix comprises: solving the first problem formula based on the causal sequence as a constraint condition, so that a directed graph represented by the candidate result is a directed acyclic graph.

According to one implementation of the present disclosure, building the causal sequence based on at least one of the plurality of variables comprises: with respect to a first variable in the causal sequence, selecting a second variable that has a causality with the first variable from the candidate result of the matrix; and adding the selected second variable to the causal sequence as a successor of the first variable.

According to one implementation of the present disclosure, a computer program product is provided. The computer program product is tangibly stored on a non-transitory computer-readable medium and comprises machine-executable instructions which, when executed, cause a machine to implement steps of the method described above.

The various implementations implementing the method of the present invention have been described with reference to the accompanying drawings. Those skilled in the art may appreciate that the method may be implemented in software, hardware or a combination thereof. Moreover, those skilled in the art may appreciate that a device based on the same inventive concept may be provided by implementing respective steps of the method in software, hardware or combination of software and hardware. Even if the device is the same as a general-purpose processing device in hardware structure, the functionality of software contained therein makes the device exhibit distinguishing characteristics over the general-purpose processing device, thereby forming a device according to the various embodiments of the present invention. The device of the present invention comprises several means or modules, which are configured to execute corresponding steps. By reading this specification, those skilled in the art may understand how to write a program to implement actions performed by the means or modules. Since the device and the method are based on the same inventive concept, like or corresponding implementation details also apply to the means or modules corresponding to the method. Since a detailed and complete description has been presented above, details may be ignored below.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for determining a causality between a plurality of variables, comprising:
   in response to a data set of a plurality of samples associated with the plurality of variables being collected, obtaining a matrix describing the causality between the plurality of variables, each sample among the plurality of samples comprising data that corresponds to the plurality of variables;
   determining fitness associated with the causality and sparsity associated with the causality based on the data set and the matrix, wherein the sparsity comprises a constraint on each vector among a plurality of vectors in the matrix, the constraint corresponding to a variable among the plurality of variables;
   building a first problem formula describing the causality according to the determined fitness and sparsity; and
   solving the built first problem formula so as to obtain a candidate result of the matrix.

2. The method of claim 1, wherein determining the fitness and the sparsity comprises: with respect to a current vector among a plurality of vectors in the matrix, determining fitness and sparsity for the current vector; and
   wherein the constraint comprises a constraint on the current vector, and determining the sparsity for the current vector comprises:
   determining a weight vector in the constraint on the current vector; and
   determining the sparsity for the current vector based on the determined weight vector and the current vector.

3. The method of claim 2, wherein determining the weight vector comprises:
   determining sparsity for the current vector based on an initial value of the weight vector;
   building a second problem formula associated with the current vector according to the fitness for the current vector and the sparsity for the current vector;
   solving the second problem formula so as to obtain the current vector; and
   determining the weight vector based on the obtained current vector.

4. The method of claim 3, further comprising: determining the initial value of the weight vector, comprising determining the initial value based on a least square operation associated with the current vector.

5. The method of claim 4, wherein determining the initial value based on the least square operation associated with the current vector comprises:
   determining the $d^{th}$ element $w_{j,d}^{ini}$ in the initial value based on the following formula:

$$w_{j,d}^{ini} = \frac{|\beta_{j,d}(ols)|}{\|\beta_j(ols)\|_1}, \beta_j(ols) = (x_{-j}^T x_{-j})^{-1} x_{-j}^T x_j,$$

wherein $\beta_j$ represents the current vector, $\beta_{j,d}$ represents the $d^{th}$ element in the current vector $\beta_j$, $\beta_{j,d}(ols)$ represents a least square operation, $|\ |$ represents an absolute value operation, $\|\ \|_1$ represents a 1-norm operation, $x_j$ represents a portion associated with the current vector $\beta_j$ among the plurality of samples, $x_{-j}$ represents a portion associated with vectors other than the current vector $\beta_j$ among the plurality of samples, T represents a transpose operation, j=1, p, and p represents a number of the plurality of variables.

6. The method of claim 5, wherein determining the weight vector based on the current vector comprises:
   determining a corresponding element in the weight vector based on an element in the obtained current vector.

7. The method of claim 6, wherein determining the corresponding element in the weight vector based on the element in the obtained current vector comprises:
   determining the $d^{th}$ element $w_{j,d}$ in the weight vector $w_j$ based on the following formula:

$$w_{j,d} = \frac{|\beta_{j,d}|^{\frac{1}{1+\gamma}}}{\|\text{abs}(\beta_j)^{\frac{1}{1+\gamma}}\|_1},$$

wherein $\beta_{j,d}$ represents the $d^{th}$ element in the current vector $\beta_j$, $\gamma$ represents a predetermined parameter, and abs( ) represents an absolute value operation.

8. The method of claim 7, wherein determining the sparsity for the current vector comprises: determining the sparsity $\text{Sparsity}_j$ for the current vector $\beta_j$ based on:
   $\text{Sparsity}_j = \|w_j \odot \beta_j\|_1$, wherein $\odot$ represents a dot-product operation.

9. The method of claim 7, wherein determining the sparsity for the current vector comprises: determining the sparsity $\text{Sparsity}_j$ for the current vector $\beta_j$ based on:
   $\text{Sparsity}_j = \|w_j^{-\gamma} \odot \beta_j\|_1$, wherein $\odot$ represents a dot-product operation.

10. The method of claim 7, wherein determining the sparsity for the current vector further comprises:
    determining a weight coefficient $\lambda_j$ in the constraint on the current vector; and
    determining the sparsity for the current vector comprises determining the sparsity $\text{Sparsity}_j$ for the current vector $\beta_j$ based on:

Sparsity$_j$=$\|w_j^{-\gamma} \odot \beta_j\|_1$, wherein $\odot$ represents a dot-product operation.

11. The method of claim 2, wherein building the first problem formula comprises: building the first problem formula based on:

$$\min_{\beta_1,\ldots,\beta_p} \sum_{j=1}^{p} \|x_j - x_{-j}\beta_j\|_2^2 + Sparsity_j$$

wherein p represents a number of the plurality of variables, $x_j$ represents a portion associated with the current vector $\beta_j$ among the plurality of samples, $x_{-j}$ represents a portion associated with vectors other than the current vector $\beta_j$ among the plurality of samples, $\|x_j-x_{-j}\beta_j\|_2^2$ represents fitness for the current vector $\beta_j$, $\|\ \|_2^2$ represents a 2-norm operation, and Sparsity$_j$ represents sparsity for the current vector $\beta_j$.

12. The method of claim 1, wherein building the first problem formula describing the causality further comprises: building a causal sequence based on at least one variable among the plurality of variables; and solving the first problem formula so as to obtain a candidate result of the matrix comprises: solving the first problem formula based on the causal sequence as a constraint condition, so that a directed graph represented by the candidate result is a directed acyclic graph.

13. The method of claim 12, wherein building the causal sequence based on at least one variable among the plurality of variables comprises:

with respect to a first variable in the causal sequence, selecting a second variable that has a causality with the first variable from the candidate result of the matrix; and adding the selected second variable to the causal sequence as a successor of the first variable.

14. A computer program product, tangibly stored on a non-transitory computer-readable medium and comprising machine-executable instructions, which, when executed, cause a machine to implement the steps of a method according to claim 1.

15. A device for determining a causality between a plurality of variables, comprising one or more processors configured to;

in response to a data set of a plurality of samples associated with the plurality of variables being collected, obtain a matrix describing the causality between the plurality of variables, each sample among the plurality of samples comprising data that corresponds to the plurality of variables;

determine fitness associated with the causality and sparsity associated with the causality based on the data set and the matrix, wherein the sparsity comprises a constraint on each vector among a plurality of vectors in the matrix, the constraint corresponding to a variable among the plurality of variables;

build a first problem formula describing the causality according to the determined fitness and sparsity; and solve the built first problem formula so as to obtain a candidate result of the matrix.

\* \* \* \* \*